2,894,803

METHOD FOR THE PREPARATION OF MONOBROMOPENTABORANE-9

Murray S. Cohen, Dover, N.J., and Carl E. Pearl, Azusa, Calif., assignors, by mesne assignments, to Thiokol Chemical Corporation, a corporation of Delaware No Drawing. Original application March 1, 1956, Serial No. 568,702. Divided and this application April 30, 1956, Serial No. 581,808

5 Claims. (Cl. 23—14)

This invention relates to a novel composition of matter and to a process of preparing it. More particularly, the novel composition of matter is monobromopentaborane of the formula $B_5H_8Br$.

According to Stock et al., Ber. 47, 3115 (1914), diborane reacts with chlorine in the absence of a catalyst to form various chlorine substitution products of diborane, including monochlorodiborane. However, this product was not isolated. Monobromodiborane was isolated from the reaction mixture of diborane and bromine. Schlesinger et al., Chem. Rev. 31, 11 (1942), mentions the direct attack of chlorine on pentaborane but describes the product briefly as probably a mixture of isomers not further identified. Stock et al., Ber. 47, 3115 (1914), also reports that, using a large excess of liquid bromine, decaborane yielded a dibromodecaborane but no monobromodecaborane was found. Stock et al., Ber. 62, 90 (1929), investigated the action of iodine on decaborane and isolated diiododecaborane and products containing larger proportions of iodine but no monoiodo compound was found. The bromination of pentaborane does not appear to have been previously investigated. From the prior descriptions of the halogenation of boron hydrides, it is impossible to predict the behavior of pentaborane-9 on bromination.

The process of the present invention comprises the reaction of bromine with pentaborane in the presence of aluminum chloride or aluminum bromide as catalyst. Carbon bisulfide is a particularly suitable solvent for use in the bromination of this invention. Generally from 0 grams of solvent to 25.0 grams of solvent per gram of pentaborane-9 are used. At temperatures between about —30° C. and 45° C., the reaction proceeds readily to form monobromopentaborane-9 in the presence of a solvent. Little or no polybrominated pentaboranes are formed.

In carrying out the process of this invention, pentaborane-9 can be dissolved in an inert solvent, suitably carbon bisulfide, and bromine added directly or as a solution in additional carbon bisulfide. The addition can be accomplished at temperatures between the boiling point of carbon bisulfide and about —30° C. or lower. The reaction at room temperature is entirely satisfactory and is most convenient.

After completion of the reaction any excess bromine and hydrogen bromide is removed suitably by the passage of a stream of inert gas through the solution and the solvent is removed by distillation. The residue is preferably vacuum distilled to obtain monobromopentaborane-9.

The use of carbon bisulfide as a solvent in the process of the present invention is not an essential feature and the reaction can satisfactorily be carried out by direct action of bromine on pentaborane-9. However, it is important under these conditions, where no solvent is employed, to maintain the temperature at about 0° C. to —30° C. or lower and it is usually more convenient to use carbon bisulfide or other inert solvent.

The proportion of bromine to be used in the process of the present invention is usually about 1 mole per mole of pentaborane-9. There appears to be no advantage in the use of large proportions of bromine since they remain largely unreacted and little or no dibromopentaborane is formed. At least about 1 mole of bromine per mole of pentaborane-9 is advantageously used since smaller proportions leave unreacted pentaborane-9 which requires recovery for economical operation. Generally, from about one mole to two moles of bromine is employed per mole of pentaborane-9.

As catalysts, anhydrous aluminum chloride or anhydrous aluminum bromide are suitable. The proportion of catalyst can vary widely from as much as 1 mole per mole of pentaborane-9, or more, to as little as 0.05 mole of catalyst per mole of pentaborane-9, or less. About 0.1 mole of aluminum halide per mole of pentaborane-9 is sufficient and is preferred.

It is an advantage of the novel compound of the present invention that it has a relatively low melting point of about 35° C. and is amenable to pumping through warm lines with little danger of clogging by crystallization. The product is soluble in hydrocarbon and other solvents, the addition of minor proportions of which lowers the melting point still further. An example of such a composition having a melting point below room temperature is 90 percent by volume of monobromopentaborane-9 and 10 percent by volume of kerosene. Monobromopentaborane-9 is a stable liquid which can be vacuum distilled without decomposition but the compound itself and mixtures containing large proportions of it react violently with water. This property makes monobromopentaborane-9 particularly useful in several ways one of which, for example, is in the automatic signalling flare of the copending application of Murray S. Cohen and T. W. Brennan, Serial No. 581,629, filed April 30, 1956, now Patent No. 2,814,249.

Example I

A solution containing 30.0 g. (0.477 mole) of pentaborane-9 in 200 ml. of carbon bisulfide was placed in a reaction flask equipped with a dropping funnel, stirrer, thermometer and a means of removing solvent by distillation. The entire system was placed under an atmosphere of dry nitrogen and 5.28. g. (0.04 mole) of anhydrous aluminum chloride was added. Bromine, 76.5 g. (0.477 mole) dissolved in 100 ml. of carbon bisulfide, was run into the solution through the dropping funnel over a period of three hours at —10° C. to —5° C. At the end of the reaction a stream of nitrogen was blown through the solution at —10° C. to remove the last traces of hydrogen bromide. The pale red solution was then heated on a water bath and the carbon bisulfide removed by distillation leaving a dark-colored oil. Reducing the pressure to 34 mm. of mercury, the residue was distilled and a fraction comprising the monobromopentaborane-9 product boiling at 80–82° C. at 34 mm. of mercury was collected. The colorless oil crystallized on standing. It weighed 47.0 g. and melted at 34–36° C.

A 0.2581 g. sample of this material when hydrolyzed with aqueous dioxane evolved 20.70 moles of hydrogen. The theoretical value is 20.00 moles. Molecular weight determinations gave values of 144.2 and 146.5 compared with the theoretical value of 142. A 0.1342 g. sample when hydrolyzed and titrated with standard alkali and mannitol gave a value of 37.80 percent boron. The theoretical value is 38.10 percent.

This application is a division of our copending application Serial No. 568,702, filed March 1, 1956, now abandoned for Product and Process.

We claim:
1. A method for the prepartion of monobromopentaborane-9 of the formula $B_5H_8Br$ which comprises reacting pentaborane-9 and bromine while the reactants are in admixture with a catalytic amount of a halide selected from the group consisting of aluminum chloride and aluminum bromide.
2. The method of claim 1 wherein the reaction is conducted at a temperature within the range from $-30°$ C. to $+45°$ C.
3. The methad of claim 1 wherein the reaction is conducted at a temperature within the range from $-30°$ C. to $+45°$ C. while the reactants are in admixture with an inert solvent.
4. The method of claim 3 wherein the inert solvent is carbon bisulfide.
5. The method of claim 1 wherein the reaction is conducted at a temperature within the range from $-30°$ C. to $0°$ C. in the absence of an inert solvent reaction medium.

References Cited in the file of this patent

Schlesinger et al.: "Chemical Reviews," vol. 31, pp. 10, 11, August 1942. (Entire article includes pages 1–41.)